US011780009B2

(12) United States Patent
Mangold et al.

(10) Patent No.: US 11,780,009 B2
(45) Date of Patent: Oct. 10, 2023

(54) METHOD FOR PRODUCING A PISTON

(71) Applicant: Mahle International GmbH, Stuttgart (DE)

(72) Inventors: Sebastian Mangold, Stuttgart (DE); Benjamin Schmieder, Stuttgart (DE)

(73) Assignee: Mahle International GmbH

( * ) Notice: Subject to any disclaimer, the term of this patent is extended or adjusted under 35 U.S.C. 154(b) by 13 days.

(21) Appl. No.: 17/350,626

(22) Filed: Jun. 17, 2021

(65) Prior Publication Data

US 2022/0032371 A1 Feb. 3, 2022

(30) Foreign Application Priority Data

Jun. 17, 2020 (DE) .................... 10 2020 207 512.3

(51) Int. Cl.
| | |
|---|---|
| *F02F 3/22* | (2006.01) |
| *B22F 5/00* | (2006.01) |
| *B22F 10/28* | (2021.01) |
| *B22F 3/24* | (2006.01) |
| *B23P 15/10* | (2006.01) |
| *F02F 3/00* | (2006.01) |
| *B33Y 10/00* | (2015.01) |
| *B33Y 80/00* | (2015.01) |

(52) U.S. Cl.
CPC ................ *B22F 5/008* (2013.01); *B22F 3/24* (2013.01); *B22F 10/28* (2021.01); *B23P 15/10* (2013.01); *F02F 3/003* (2013.01); *F02F 3/22* (2013.01); *B22F 2003/247* (2013.01); *B22F 2003/248* (2013.01); *B33Y 10/00* (2014.12); *B33Y 80/00* (2014.12)

(58) Field of Classification Search
CPC .................................... F02F 3/003; F02F 3/22
See application file for complete search history.

(56) References Cited

U.S. PATENT DOCUMENTS

| 10,065,277 B2 | 9/2018 | Scharp et al. |
| 10,208,702 B2 | 2/2019 | Rotmann et al. |
| 10,265,811 B2 | 4/2019 | Berr et al. |
| 2014/0197142 A1* | 7/2014 | Wilder .................... F02F 3/003 92/260 |

(Continued)

FOREIGN PATENT DOCUMENTS

| DE | 10 2011 013 141 A1 | 9/2012 |
| DE | 10 2011 116 332 A1 | 1/2013 |

(Continued)

OTHER PUBLICATIONS

European Search Report dated Oct. 25, 2021 for copending European App. No. EP21178848.
English abstract for DE-10 2018 007 215.
English abstract for DE-10 2018 214 230.
English abstract for DE-10 2017 123 197.

*Primary Examiner* — Long T Tran
(74) *Attorney, Agent, or Firm* — Fishman Stewart PLLC

(57) ABSTRACT

A method for producing a piston for an internal combustion engine may include producing a piston upper part including a piston top, at least parts of a ring section, and at least part of a cooling channel, producing a piston lower part and closing the part of the cooling channel arranged in the piston upper part via an additive method, and finish-machining the piston. Finish-machining the piston may include producing at least one annular groove in a ring support for receiving a piston ring.

19 Claims, 2 Drawing Sheets

(56) References Cited

U.S. PATENT DOCUMENTS

| | | | |
|---|---|---|---|
| 2014/0238232 A1* | 8/2014 | Lapp | F02F 3/22 |
| | | | 92/172 |
| 2014/0290618 A1 | 10/2014 | Bischofberger | |
| 2014/0299091 A1* | 10/2014 | Ribeiro | B22F 5/008 |
| | | | 164/76.1 |
| 2016/0059366 A1* | 3/2016 | Flowers | B23P 15/10 |
| | | | 92/172 |
| 2017/0022930 A1 | 1/2017 | Takahashi | |
| 2018/0087470 A1* | 3/2018 | Evers | F02F 3/003 |
| 2018/0119635 A1 | 5/2018 | Wandrie, III | |
| 2019/0107076 A1* | 4/2019 | Fregni | F02B 23/06 |
| 2019/0218996 A1* | 7/2019 | Mori | F02F 3/22 |
| 2020/0325988 A1* | 10/2020 | Barnes | F02F 3/003 |

FOREIGN PATENT DOCUMENTS

| | | |
|---|---|---|
| DE | 10 2013 014 346 A1 | 10/2014 |
| DE | 10 2015 216 321 A1 | 3/2017 |
| DE | 10 2017 123 197 A1 | 4/2019 |
| DE | 10 2018 007 215 A1 | 4/2019 |
| DE | 10 2018 214 230 A1 | 2/2020 |
| EP | 3 406 367 A1 | 11/2018 |
| WO | 14/165734 A1 | 10/2014 |
| WO | 15/134424 A1 | 9/2015 |
| WO | 17/029186 A1 | 2/2017 |
| WO | 17/150321 A1 | 9/2017 |
| WO | 18/063863 A1 | 4/2018 |
| WO | 19/143403 A1 | 7/2019 |

\* cited by examiner

METHOD FOR PRODUCING A PISTON

CROSS-REFERENCE TO RELATED APPLICATION

This application claims priority to German Patent Application No. DE 10 2020 207 512.3, filed on Jun. 17, 2020, the contents of which is hereby incorporated by reference in its entirety.

TECHNICAL FIELD

The present invention relates to a method for producing a piston in an internal combustion engine from a piston upper part and a piston lower part. The invention furthermore relates to a piston produced by this method.

BACKGROUND

WO 2014/165734 A1 discloses a method of the type in question for producing a piston, in which a piston lower part having a piston skirt and piston pin bosses is cast or forged and the piston upper part is then produced by means of an additive hardening method on the basis of this.

WO 2015/134424 A1 discloses a method for producing a piston in which a piston main body having a ring section, a piston skirt and a cooling channel open towards the piston top is cast or forged. In a subsequent method step, the cooling channel, which is initially open towards the piston top, is closed by means of an additive method.

WO 2018/063863 A1 again discloses a method for producing a piston in which an initially open cooling channel groove is closed by means of an additive method.

However, the disadvantage of the known pistons is that, in particular, the regions of the piston which are subjected to high thermal and mechanical loads during subsequent operation are produced by means of an additive method, which can lead to problems in the long term because of the lower strength that is achievable with the additive method. In order to compensate for these disadvantages, the piston is often designed to be stronger in the additively produced part, but this causes an increase in weight and thus also an increase in fuel consumption in subsequent operation.

SUMMARY

The present invention is therefore concerned with the problem of specifying an improved or at least an alternative embodiment for a method for producing a piston which, in particular, no longer has the disadvantages known from the prior art.

According to the invention, this problem is solved by the subject matter of the independent claim(s). Advantageous embodiments form the subject matter of the dependent claim(s).

The present invention is based on the general concept of producing a piston essentially from a piston upper part, in particular a forged or cast piston upper part, and an additively produced piston lower part. The advantage of this procedure is that, in the case of additive buildup, comparatively free shaping is possible, which can be achieved only with great difficulty, if at all, with conventional production methods, e.g. casting or forging. Moreover, such a method offers the great advantage that the regions of a piston which are subjected to high thermal and mechanical loads, namely the piston upper part, are produced in a conventional way, in particular cast or forged, while the regions which are subjected to lower loads in a piston lower part are produced by means of an additive method. The method according to the invention has the following method steps: first of all, the piston upper part, which has a piston top, at least parts of a ring section and at least part of a cooling channel, is produced, being forged or cast as a disk for example, wherein a ring support can be forged or cast in and thereby firmly embedded in the material of the piston upper part. Subsequently, the piston lower part is produced and the part of the cooling channel which is arranged in the piston upper part is closed by means of an additive method, e.g. by means of laser melting or laser sintering. Finally, the piston is finish-machined, including the production of at least one annular groove, in particular in the ring support, for subsequently receiving a piston ring, wherein such finish-machining can be accomplished by means of turning, milling, grinding and/or lapping, for example. With the method according to the invention, it is possible for the first time to produce regions of a piston which are subjected to high thermal and mechanical loads in a conventional manner, by means of forging or casting for example, while regions which are subjected to lower thermal and mechanical loads, in this case the piston lower part, are produced by means of an additive method. A further advantage of the method according to the invention is, for example, that part of the cooling channel can be situated in the piston upper part and part of the cooling channel can also be situated in the piston lower part, thereby making it possible to produce a kidney shape, for example, which can be achieved only with difficulty by means of a salt core or more generally by means of a casting core. Owing to the initially open part of the cooling channel in the piston upper part, an inner surface of this part of the cooling channel can be additionally roughened, thereby leading to an increase in the surface area and, as a result, making it possible to achieve better heat transfer. Closing the cooling channel by means of an additive method furthermore makes it possible to produce different components, e.g. jet splitters or cooling fins, which can be produced only with very great difficulty, if at all, with conventional production methods, such as casting cores, and which significantly improve cooling. In addition, it is possible to save material in the additively manufactured piston lower part in the skirt and boss region at less stressed points, which it was not possible to achieve in this way with the conventional casting or forging process, as a result of which the piston can be designed to be lighter overall.

In an advantageous development, a ring support, which forms the annular groove, is forged or cast into the piston upper part. As a result, the annular groove can be produced from a material different from the piston upper part.

In an advantageous development of the solution according to the invention, the part of the cooling channel which is situated in the piston upper part is introduced by means of forging, a casting core or a chip-removing method. Thus, if the piston upper part is cast, for example, a corresponding casting core, e.g. a salt core, can be used to form the cooling channel. If the piston upper part is forged, the part of the cooling channel which is situated in the piston upper part can be forged in by means of a correspondingly shaped forging punch. Of course, a chip-removing method is also conceivable, in which the part of the cooling channel which is situated in the piston upper part is introduced into the piston upper part after completion of the forging or casting process. In particular, the chip-removing method offers the great advantage here that the piston upper part can be prefabricated as a disk and only with the ring support inserted, and the introduction of the cooling channel part takes place only in a subsequent method step, e.g. by means of milling, grinding or chip removal.

In an advantageous development of the solution according to the invention, the piston upper part is face turned, at least on a side facing the piston lower part, before the additive production of the piston lower part, that is to say before the piston lower part is built up additively on the piston upper part. In this context, such face turning or facing, in particular also face grinding, preferably takes place before the part of the cooling channel which is situated in the piston upper part is introduced, insofar as this is introduced after forging or casting. Such a faced side makes it significantly easier to additively build up the piston lower part. In the additive buildup of the piston lower part, the piston upper part is turned upside down, thus enabling additive buildup of the piston lower part to take place from above. By face turning, a flat base/joining surface can be produced so that the AM process (additive process) can be carried out thereon without problems. In addition, the surface quality can already be influenced via the process parameters in such a way that they are advantageous for the AM process, for example the setting of a certain roughness.

In a further advantageous embodiment of the solution according to the invention, a part of the cooling channel which is situated in the region of the piston lower part has a rougher surface than the part of the cooling channel which is situated in the piston upper part, which surface is produced by means of an additive method. By additive production of the piston lower part and closure of the cooling channel by means of an additive method, it is possible to make an inner surface of the cooling channel rougher, as a result of which the surface area per se can be enlarged and heat transfer and thus also cooling of the piston can be improved. Here, closure of the part of the cooling channel which is situated in the piston upper part by the additive buildup of the piston lower part can optionally entail that the cooling channel in the piston upper part is merely closed or that a separate part of the cooling channel is additionally formed in the piston lower part. An almost unlimited choice of cross-sectional shapes for the cooling channel is conceivable by means of an additive process, in particular, for example, also a kidney-shaped cross section, which it would be possible to produce only with difficulty, if at all, with salt cores on account of the fragility of said cores.

It is expedient if a part of the cooling channel which is situated in the region of the piston lower part has at least one of the following components, which are produced by means of an additive method: an oil-guiding structure, such as a jet splitter, a ramp, a cooling fin or a constriction. In general, it is possible with such an additive process to produce fine structures which can be selected almost arbitrarily with respect to their shape and which, geometrically, cannot be turned, forged or produced by salt cores. In particular, reference may also be made at this point to the possibility of providing double or multiple cooling channels and connected cavities at weakly loaded points in the piston lower part, which contribute to a saving in mass and thus a reduction in weight and make operation of an internal combustion engine equipped with such a piston more economical. Such closed cavities could moreover be arranged in such a way that they represent heat conduction obstacles and thereby direct heat conduction in a specific direction in the piston. Particularly targeted heat dissipation and thus particularly targeted cooling of such a piston can thereby be achieved.

It is expedient if the piston upper part is produced from a steel alloy or from an aluminum alloy. It is thus possible, for example, to design the piston upper part with a comparatively high strength, e.g. as an aluminum piston with an embedded ring support. As a result, regions subject to the greatest mechanical and thermal loads can be embodied with the appropriate strength.

In a further advantageous embodiment of the solution according to the invention, the piston lower part is produced by means of laser melting. Laser melting belongs to the group of beam melting processes and is an additive manufacturing method in which the material to be processed, e.g. metal, in particular aluminum, is applied in powder form in a thin layer to the piston upper part and is completely remelted locally by means of laser radiation. After the remelted material has solidified, it forms a solid material layer. Subsequently, the piston upper part is lowered by the amount of the previously applied layer thickness, and the material to be processed is again applied in powder form, e.g. aluminum powder. This continues until all the layers have been remelted and the piston lower part has been completely built up. Cleaning or finish-machining then takes place. The great advantage of such laser melting lies in the inexpensive and high-quality construction of the piston lower part, while, at the same time, an almost unlimited choice of shapes, and even the formation of cavities, is possible without problems.

In a further advantageous embodiment of the solution according to the invention, the piston upper part is cast, in particular by means of gravity chill casting, wherein the ring support is alfinized beforehand in an aluminum melt, e.g. in an aluminum-silicon melt. A particularly good connection between the ring support and the base material of the piston upper part can be achieved by means of such alfinizing. This is of great advantage, in particular, if the material for the piston upper part is a ferrous material.

In a further advantageous embodiment of the solution according to the invention, the piston lower part has at least parts of a piston pin boss and/or of a piston skirt, which are produced by means of an additive method. In purely theoretical terms, it is thus possible for the piston upper part to have not only the piston top, at least parts of a ring section and at least parts of a cooling channel but also, for example, parts of a piston skirt or parts of a piston pin boss. There is an almost unlimited choice in respect of the division of the ring section, the cooling channel, the piston pin boss and the piston skirt, the piston lower part usually having at least parts of the piston skirt and parts of the piston pin boss. However, the piston lower part can additionally also have part of the ring section, in particular parts of a ring section below the ring support. The great advantage thus lies in the fact that the division of individual regions between the piston upper part and the piston lower part can be freely selected and adapted to appropriate manufacturing processes on a custom basis.

It is expedient if the cooling channel has a non-rotationally symmetrical shape with respect to a piston vertical axis and/or a piston transverse axis. Custom cooling effects can thereby be achieved, for example increased cooling at certain points by virtue of the respective cooling channel geometry. It is also possible for the cooling channel to branch or for a plurality of cooling channels to be introduced into the piston, which is not possible in this way with conventional production methods, e.g. forging or casting.

In an advantageous development of the invention, provision is made for the piston, consisting of the piston upper part and the piston lower part, to be subjected to a heat treatment prior to finish-machining. This tempering is used for stress reduction. During this process, the hardness decreases and the toughness increases.

The present invention is furthermore based on the general concept of specifying a piston which is produced by the method described above. A piston of this kind offers the great advantage that the piston upper part, which absorbs high mechanical and thermal loads, has a high strength, since it was produced in a conventional manner, for example by means of conventional forging or casting, while the piston lower part, which has to absorb lower thermal and mechanical loads, can be produced by means of an additive method. Additive production of the piston lower part furthermore offers the great advantage of making an inner surface of a cooling channel situated in the piston lower part rougher and thus with a larger surface area, and also of making the entire piston lower part thinner, thereby making it possible to save weight. Even the provision of cavities is possible without problems, as is the provision of a plurality of cooling channels or of cooling channels having a complex cross-sectional shape, e.g. a kidney shape, which can be achieved only with very great difficulty, if at all, with conventional production methods, e.g. casting cores. Furthermore, the production of cavities makes it possible to guide the outflow of heat in the piston lower part.

Further important features and advantages of the invention will be found in the dependent claims, the drawings and the associated description of the figures with reference to the drawings.

It is self-evident that the features mentioned above and those that will be explained below can be used not only in the respectively specified combination but also in other combinations or on their own without departing from the scope of the present invention.

Preferred exemplary embodiments of the invention are illustrated in the drawings and are explained in greater detail in the following description, wherein identical reference signs refer to identical or similar or functionally identical components.

BRIEF DESCRIPTION OF THE DRAWINGS

The following figures are each schematic, wherein.

DETAILED DESCRIPTION

Figure 1:
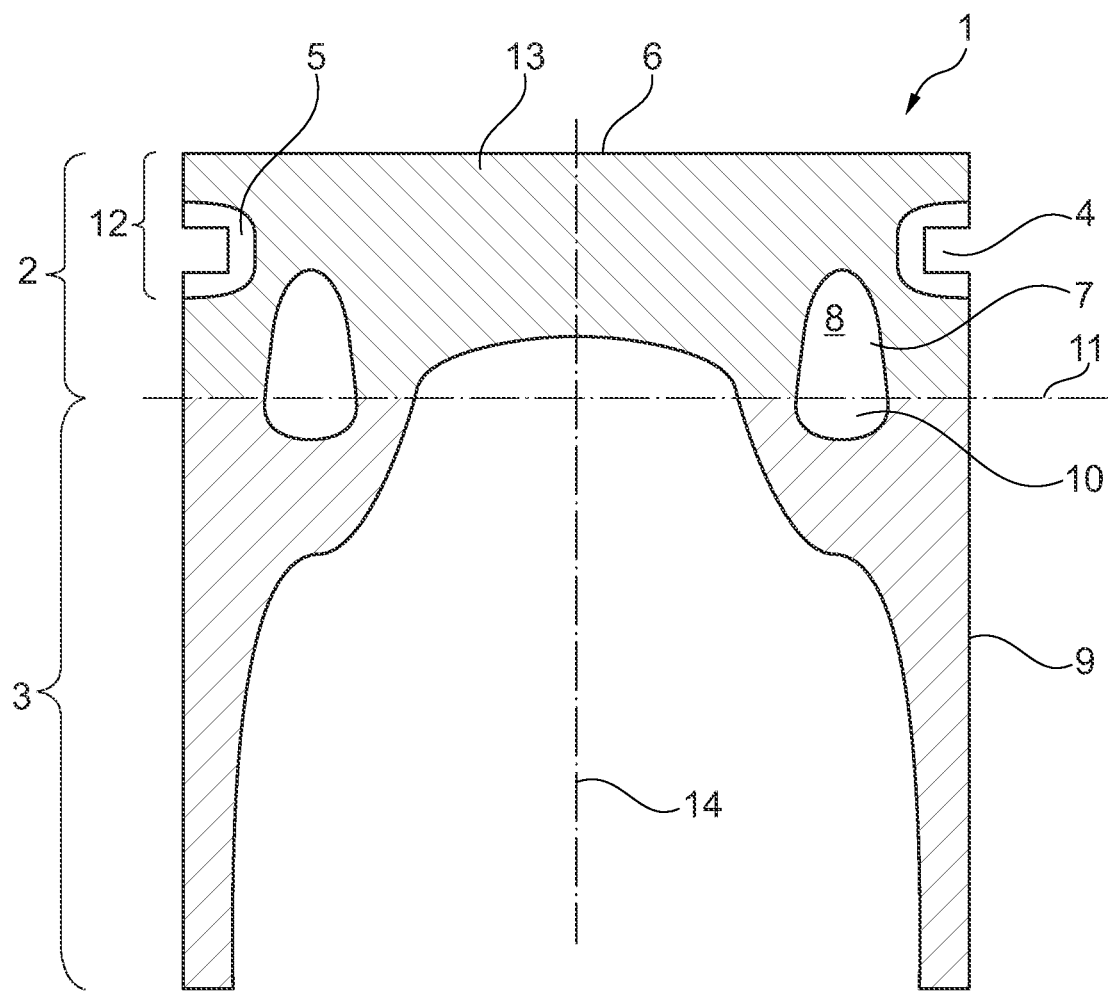
FIG. 1 shows a sectional view through a piston produced by a method according to the invention.

In accordance with FIG. 1, a piston 1 according to the invention produced by a method according to the invention (compare FIGS. 2 to 4) for an internal combustion engine (not shown) has an piston upper part 2 and a piston lower part 3. At least one annular groove 4, which is formed or reinforced by means of a ring support 5, for example, is provided in the piston upper part 2. Moreover, the piston upper part 2 has a piston top 6 facing a combustion chamber (not shown) and a part 7 of a cooling channel 8. For the sake of simplicity, the top 6 is drawn straight according to FIG. 1, but can of course alternatively also have a combustion chamber recess.

The piston lower part 3 usually has at least a part of a piston skirt 9, which serves to guide the piston 1 in a cylinder, as well as a piston pin boss (not described specifically) for receiving a piston pin via which the piston 1 is connected to a connecting rod of the internal combustion engine. Likewise, at least parts 10 of the cooling channel 8 can be arranged in the piston lower part 3. According to FIG. 1, one part 7 of the cooling channel 8 lies above a parting plane 11 in the piston upper part 2, while the other part 10 is arranged below the parting plane 11 in the piston lower part 3.

Here, the piston upper part 2 is produced in a conventional manner, more specifically by means of a forging method or a casting method for example, while the piston lower part 3 is, according to the invention, produced by means of an additive method, e.g. a laser melting method. This offers the great advantage that the region, in this case namely the piston upper part 2, which is subjected to high mechanical and thermal loads during operation, can be formed from a comparatively solid material, while the piston lower part 3, which is subjected to lower thermal and mechanical loads, can be produced by means of the additive method.

In general, the piston 1 according to the invention is produced as follows:

First of all, the piston upper part 2 is produced, being forged or cast for example, wherein a ring support 5 can be forged or cast into the material 13 of the piston upper part 2. The piston upper part 2 has the piston top 6 and at least parts of a ring section 12 and at least part 7 of the cooling channel 8 (cf. FIG. 2).

Figure 2:
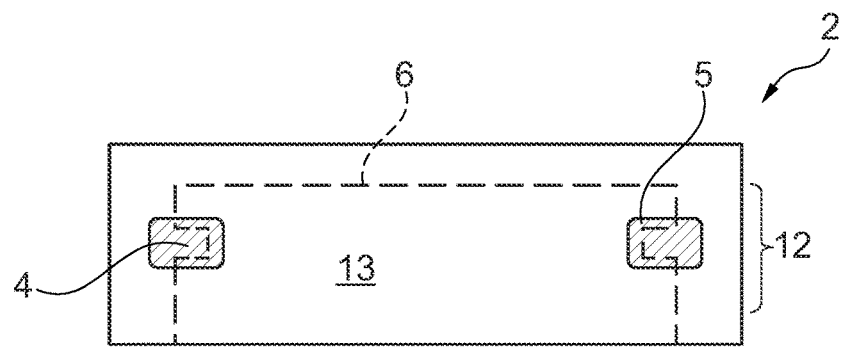
FIG. 2 shows a first method step of the method according to the invention for producing a piston upper part.
Figure 3:
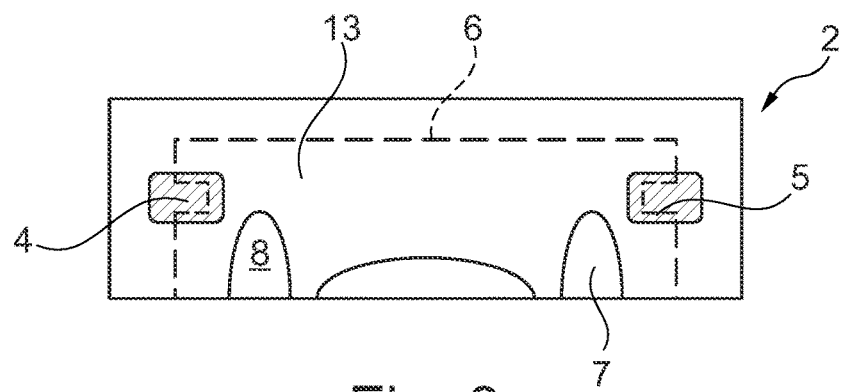
FIG. 3 shows an illustration like that in FIG. 2, but with an additional cooling channel.

In this case, the part 7 of the cooling channel 8 which is situated above the parting plane 11, i.e. in the piston upper part 2, can be produced by means of a corresponding punch during forging or by means of a corresponding casting core during casting of the piston upper part 2. As an alternative, it is of course also conceivable for the part 7 of the cooling channel 8 which is situated in the piston upper part 2 to be introduced into the material 13 of the piston upper part 2 by means of a chip-removing method or of milling or grinding after the production, in particular the casting or forging, of the piston upper part 2. This might be illustrated, for example, in the method step shown in FIG. 3, while FIG. 2 shows the casting or forging of the piston upper part 2 without the presence therein of part 7 of the cooling channel 8.

The piston upper part 2 is then turned over, whereupon the piston lower part 3 (cf. FIG. 4) is produced by means of an additive method and, at the same time, the cooling channel 8 can be closed in the process. In the additive production method, it is of course possible for the cooling channel 8 to be closed directly and in a level manner along the subsequent parting plane 11, or part 10 of the cooling channel 8 is provided in the piston lower part 3.

The great advantage of a piston 1 produced in this way is that the region of the piston 1 which is subject to the highest thermal and mechanical loads, namely the piston upper part 2, can be cast or forged from a comparatively strong material, e.g. an aluminum alloy or a steel alloy, while the piston lower part 3, which is exposed to lower thermal and mechanical loads, is produced by means of the additive method. Here, the additive method offers the great advantage that it is thereby also possible, for example, to produce cavities (not shown), particularly at points subject to low mechanical loading, it being possible, by means of these cavities in the piston lower part 3, to achieve not only a weight saving but also targeted heat dissipation since such cavities act as a heat conduction obstacle.

Before the additive production of the piston lower part 3, the piston upper part 2 can be faced, in particular face turned, at least on a side facing the piston lower part 3.

The part 10 of the cooling channel 8 which is situated in the region of the piston lower part 3 can have a rougher surface than the part 7 of the cooling channel 8 which is situated in the piston upper part 2, which surface is produced by means of the abovementioned additive method. A rougher surface of this kind can be produced only at very great expense, if at all, by means of casting cores or in a casting process, for example. By means of a rough surface of this kind, it is possible to achieve a larger surface area and hence improved heat exchange and improved cooling of the piston 1.

Moreover, it is conceivable that the part 10 of the cooling channel 8 which is situated in the region of the piston lower part 3 has at least one of the following components (not depicted), which are likewise produced by means of additive methods: an oil-guiding structure, such as a jet splitter, a ramp, a cooling fin or a constriction. By means of such constrictions, it is possible, in particular, to create a plurality of cooling channels 8, in particular mutually separate cooling channels 8, which can be produced only with difficulty, if at all, by means of conventional production methods, e.g. casting. This also concerns special cross-sectional shapes, for example, such as a kidney-shaped cross section of the cooling channel 8, which is possible only with very great difficulty, if at all, when casting by means of casting cores, e.g. salt cores, owing to the fragility of salt cores. By means of the additive method according to the invention, however, it is possible to produce the abovementioned components without problems, offering a further major advantage over conventional production of such a piston.

The piston upper part 2 can be cast, for example, in particular by means of gravity chill casting, wherein the ring support 5 is alfinized beforehand in an aluminum melt, e.g. in an aluminum-silicon melt, in order to be able to achieve a reliable bond with the material 13 of the piston upper part 2.

In this case, the parting plane 11 depicted in FIG. 1 can of course also be situated further up or further down, and therefore the piston lower part 3 can also include parts of the ring section 12, for example.

After the production of the piston lower part 3 and the closure of the part 7 of the cooling channel 8 which is arranged in the piston upper part 2 by means of an additive method, the piston 1 is finished, e.g. by turning, grinding and/or lapping, wherein the annular groove 4 is introduced into the ring support 5.

Figure 4:
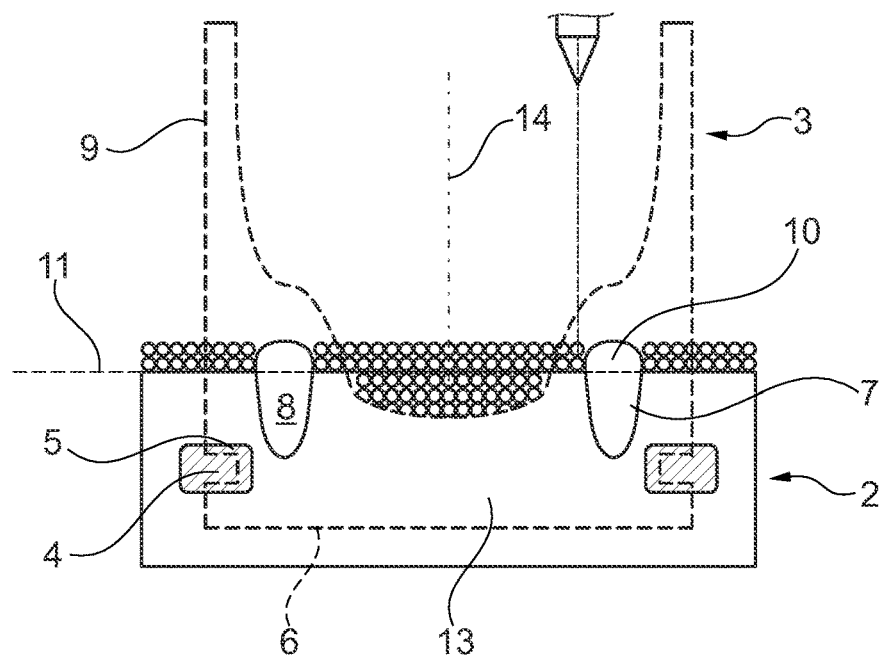
FIG. 4 shows an additive method according to the invention for producing a piston lower part on the cast or forged piston upper part.

According to FIG. 2, the subsequent contour of the piston upper part 2 or of the piston 1 is illustrated by means of a broken line, as it is in FIG. 4 too. In the finish-machining of the piston 1, the material outside this broken line is thus removed, and the piston 1 is reduced to the outer contour thereof indicated by the broken line. In this step, it is of course also possible for machining, e.g. grinding or turning, of the piston lower part 3 to take place.

By means of the combination according to the invention of a conventional production method, in particular casting or forging, of the piston upper part 2 with additive buildup of the piston lower part 3, it is possible to create a combined piston 1 according to the invention which has considerable degrees of freedom, especially in the construction of the piston lower part 3. Moreover, of particular advantage here is the fact that the piston lower part 3 produced by means of the additive method can be thinned out in regions which it was not possible to make thinner in a legacy casting or forging process, for example, owing to the production method. These are, for example, regions of attachment between the piston pin boss and the piston top (currently solid) or between the skirt and the ring section (see monotherm). In principle, significant degrees of freedom in respect of configuration (shape, location, position) of the cooling channel are also obtained.

The invention claimed is:

1. A method for producing a piston for an internal combustion engine, the method comprising:
    producing a piston upper part including a piston top, at least part of a ring section, and at least part of a cooling channel;
    producing a piston lower part and closing the part of the cooling channel arranged in the piston upper part via an additive method;
    prior to producing the piston lower part via the additive method, producing a flat joining surface on the piston upper part via facing the piston upper part at least on a side facing the piston lower part;
    finish-machining the piston; and
    wherein finish-machining the piston includes producing at least one annular groove in a ring support for receiving a piston ring.

2. The method according to claim 1, wherein:
    producing the piston upper part includes at least one of forging and casting the ring support into the piston upper part;
    the ring support is composed of a first material;
    the piston upper part is composed of a second material that is different than the first material; and
    the ring support forms the annular groove.

3. The method according to claim 1, wherein producing the piston lower part via the additive method includes forming a second part of the cooling channel in a region of the piston lower part, the second part of the cooling channel having a rougher surface than the part of the cooling channel arranged in the piston upper part, wherein the rougher surface of the second part of the cooling channel is produced via the additive method.

4. The method according to claim 1, wherein the cooling channel has a non-rotationally symmetrical shape with respect to at least one of a piston vertical axis and a piston transverse axis.

5. The method according to claim 1, wherein producing the piston lower part via the additive method includes producing, via the additive method, a second part of the cooling channel in a region of the piston lower part, the second part of the cooling channel including at least one of an oil-guiding structure, a jet splitter, a ramp, a cooling fin, and a constriction.

6. The method according to claim 1, further comprising subjecting the piston to a heat treatment prior to finish-machining the piston.

7. The method according to claim 1, wherein the piston lower part is produced via a laser melting additive method.

8. The method according to claim 7, wherein producing the piston lower part via the laser remelting additive method includes:
    applying a layer of metal powder on the piston upper part;
    locally melting the layer of metal powder via laser radiation; and
    allowing the layer of melted metal powder to solidify and form a solid material layer.

9. The method according to claim 8, wherein producing the piston lower part via the laser remelting additive method further includes producing a plurality of additional solid material layers on the solid material layer to form the piston lower part.

10. The method according to claim 1, further comprising alfinizing the ring support in an aluminum melt prior to producing the piston upper part, and wherein producing the piston upper part includes casting the piston upper part.

11. The method according to claim 1, wherein producing the piston lower part via the additive method includes producing at least part of the ring section and producing at least one of (i) at least part of a piston pin boss and (ii) at least part of a piston skirt.

12. A piston for an internal combustion engine, produced via the method according to claim 1.

13. The method according to claim 1, wherein producing the piston upper part includes introducing the part of the cooling channel into the piston upper part via at least one of a forging method, a casting core method, and a chip-removing method.

14. The method according to claim 1, wherein the cooling channel includes a plurality of branches.

15. The method according to claim 1, wherein the piston includes a plurality of cooling channels including the cooling channel.

16. The method according to claim 1, wherein facing the piston upper part includes face grinding the piston upper part.

17. The method according to claim 1, wherein producing the piston lower part and closing the part of the cooling channel arranged in the piston upper part via the additive method includes additively building up the piston lower part on the flat joining surface of the piston upper part.

18. A method for producing a piston for an internal combustion engine, the method comprising:
   producing a piston upper part via at least one of forging and casting, the piston upper part including a piston top, at least part of a ring section, and at least part of a cooling channel;
   at least partially closing the part of the cooling channel arranged in the piston upper part via producing a piston lower part on the piston upper part via an additive method; and
   producing at least one annular groove in a ring support embedded in the piston upper part, the at least one annular groove configured to receive a piston ring;
   wherein producing the piston upper part includes at least one of forging and casting the ring support into the piston upper part;
   wherein the ring support is composed of a first material;
   wherein the piston upper part is composed of a second material that is different than the first material; and
   wherein the ring support forms the annular groove.

19. A method for producing a piston for an internal combustion engine, the method comprising:
   producing a piston upper part, the piston upper part including a piston top, at least part of a ring section, and an upper portion of a cooling channel;
   producing a piston lower part on the piston upper part via an additive method; and
   producing at least one annular groove in a ring support embedded in the piston upper part, the at least one annular groove configured to receive a piston ring;
   wherein producing the piston lower part on the piston upper part via an additive method includes:
      applying a layer of metal powder on a surface of the piston upper part;
      locally melting the layer of metal powder;
      allowing the layer of melted metal powder to solidify and form a solid material layer;
      producing a plurality of additional solid material layers on the solid material layer to form the piston lower part; and
      forming a lower portion of the cooling channel with at least one of the solid material layer and at least a subset of the plurality of additional solid material layers;
   wherein the lower portion of the cooling channel has a rougher surface than the upper portion of the cooling channel; and
   wherein the rougher surface of the lower portion of the cooling channel is produced via the additive method.

* * * * *